United States Patent
Ferrato et al.

(10) Patent No.: US 7,286,854 B2
(45) Date of Patent: Oct. 23, 2007

(54) METHOD FOR CONFIGURING A COMMUNICATION NETWORK, RELATED NETWORK ARCHITECTURE AND COMPUTER PROGRAM PRODUCT THEREFOR

(75) Inventors: Marco Ferrato, Turin (IT); Enrico Giovanardi, Turin (IT); Loris Paolo Stola, Turin (IT); Valeria Dell'anna, Milan (IT); Alessandro La Piana, Milan (IT)

(73) Assignees: Telecom Italia S.p.A., Milan (IT); Pirelli & C. S.p.A., Milan (IT)

( * ) Notice: Subject to any disclaimer, the term of this patent is extended or adjusted under 35 U.S.C. 154(b) by 0 days.

(21) Appl. No.: 10/562,425

(22) PCT Filed: Jun. 27, 2003

(86) PCT No.: PCT/EP03/06800

§ 371 (c)(1),
(2), (4) Date: Dec. 27, 2005

(87) PCT Pub. No.: WO2005/004515

PCT Pub. Date: Jan. 13, 2005

(65) Prior Publication Data
US 2006/0148524 A1    Jul. 6, 2006

(51) Int. Cl.
*H04M 1/00*    (2006.01)
(52) U.S. Cl. .................. 455/562.1; 455/446; 455/553.1
(58) Field of Classification Search .............. 455/562.1, 455/446, 19, 82, 553.1; 342/378, 372
See application file for complete search history.

(56) References Cited

U.S. PATENT DOCUMENTS

| | | | | |
|---|---|---|---|---|
| 5,719,583 A | * | 2/1998 | Kanai | 342/378 |
| 6,141,565 A | | 10/2000 | Feuerstein et al. | |
| 6,442,405 B1 | * | 8/2002 | Hiramatsu et al. | 455/562.1 |
| 6,487,416 B1 | | 11/2002 | Bundy et al. | |
| 6,549,529 B1 | | 4/2003 | Drabeck et al. | |
| 7,096,040 B1 | * | 8/2006 | Scherzer et al. | 455/562.1 |

FOREIGN PATENT DOCUMENTS

| WO | WO 02/35872 A1 | 5/2002 |
|---|---|---|
| WO | WO 03/045094 A1 | 5/2003 |

\* cited by examiner

*Primary Examiner*—Sanh D. Phu
(74) *Attorney, Agent, or Firm*—Finnegan, Henderson, Farabow, Garrett & Dunner, L.L.P.

(57) ABSTRACT

A communication network includes a plurality of antennas and includes among the antennas at least one reconfigurable antenna adapted to serve communication traffic in a respective coverage area, the reconfigurable antenna having a radiation diagram exhibiting a plurality of selectively adjustable gain values for a set of directions, each direction in the set defining a propagation path between the antenna and a portion of the coverage area, determining, for each direction in the set, at least one value of communication traffic and at least one attenuation value over the propagation path, and selectively and independently alloting to each direction in the set a respective gain value as a function of at least one of the value of communication traffic and the attenuation value determined for that direction. The arrangement is adapted for use in communication networks such as second and third generation mobile communication networks employing electrically controllable antennas.

32 Claims, 4 Drawing Sheets

METHOD FOR CONFIGURING A COMMUNICATION NETWORK, RELATED NETWORK ARCHITECTURE AND COMPUTER PROGRAM PRODUCT THEREFOR

CROSS REFERENCE TO RELATED APPLICATION

This application is a national phase application based on PCT/EP2003/006800, filed Jun. 27, 2003, the content of which is incorporated herein by reference.

FIELD OF THE INVENTION

The present invention relates to communication networks and was developed by paying specific attention to the possible application in configuring cellular networks and similar communication networks including antennas with respective areas of coverage (in transmission and/or reception).

As used herein, "configuring" will generally apply both to planning networks to be deployed and to adjusting/optimising already existing networks.

DESCRIPTION OF THE RELATED ART

Research in the area of telecommunications and related technological development over the recent years had led to the possibility of designing and manufacturing radiating systems (i.e. antennas/aerials) adapted to modify their propagation characteristics.

Specifically, in addition to conventional antennas—that are essentially "passive" components—electrically controllable antennas are now available for communication systems, especially for use as base stations (BTS, SRB and the like) in mobile telecommunication systems.

The availability of these "reconfigurable" antennas (typically in the form of so-called phased-array antennas) has been so far exploited mainly in order to adapt their characteristics to the requirements of network planning while dispensing, inasmuch as possible, with the need of direct interventions at the antenna site when the antenna characteristics need to be modified.

For instance, installation workers usually climb up each antenna tower or mounting location (such as a building) to initially adjust the characteristics of each antenna (e.g. the downtilt angle) according to the values determined at the planning stage. If, for any reasons (e.g. due to the need of reconfiguring the network), the characteristics of such a traditional antenna need to be changed after installation, a worker has to access the antenna again—e.g. by again climbing up the tower where the antenna is mounted—to re-adjust the downtilt angle or even to replace the antenna.

Electrically controlled reconfigurable antennas dispense with such a need thanks to the possibility of remotely adjusting e.g. the antenna tilt.

In U.S. Pat. No. 6,487,416 a method and system are disclosed for controlling downtilt of an antenna in a sector of a cell of a code division multiple access (CDMA) network by utilising dynamic application of antenna downtilt based on estimated relative sector capacity. Specifically, in such prior art arrangement, current network conditions are monitored, relative sector capacity is estimated, and an antenna downtilt is selected. The selected antenna downtilt is dynamically applied to the antenna, preferably in order to effectively maximise relative sector capacity.

A substantially similar arrangement is disclosed in U.S. Pat. No. 6,549,529, which describes a wireless communication system including antennas having electrically controllable downtilt angles and downtilt controllers associated with each antenna. The downtilt controllers receive instruction from a main controller, and adjust downtilt angles of the associated antennas in accordance with the received instructions.

In either case, the control logic is implemented as a set of processes monitoring the network and keeping track of relevant parameters by measuring the load on a base station or coverage area to judge whether the base station and/or coverage area is overloaded.

OBJECT AND SUMMARY OF THE INVENTION

Even though going in the direction of providing a network wherein the characteristics of the various antennas can be dynamically adapted to different operating conditions, such prior art arrangements still suffer from a number of intrinsic drawbacks.

In the first place, antenna tilt (e.g. downtilt) is just one of the significant propagation characteristics of an antenna. In fact, while changing the antenna tilt may permit to somehow vary the respective area of coverage (essentially by modifying in the direction pointed by the antenna), that kind of adjustment does not lead to any changes of the azimuth characteristics, namely the actual "shape" of the radiation diagram in the horizontal plane.

Additionally, the dynamic adaptation arrangements considered in the foregoing essentially base their operation on the concept of monitoring certain operation parameters (for instance the traffic served, the interference level among the various cells and so on) for different tilt angles in order to subsequently select an optimum tilt value leading to a best performance level.

Such an optimisation process must be repeated for each antenna, with the possibility that the optimum tilt angle set for a given antenna at a given time may no longer be optimum after the tilt angles of one or more neighbouring antennas have been optimised in turn.

As a consequence, the adaptation/reconfiguration process may turn out to be slow and in some cases even lead to a situation where the system is finally adapted to meet requirements that no longer exist since that requirements have significantly changed in the meantime.

In order to better understand this, one may simply refer to those changes in the operational requirements of a communication network that may arise just for relatively short periods of time at remarkable distances over time. A typical example is given by locations (such as stadiums or other venues of sport events and the like) where large attendances—that is high traffic requirements/opportunities—may gather only for very short periods of time e.g. once a week, these location being hardly sources of any appreciable traffic over the rest of the week.

Similar examples are represented by roads or motorways likely to exhibit for short periods of time (e.g. on Sunday evenings) levels of occupancy—and therefore levels of telecommunication traffic to be served—largely in excess of the average level over the rest of the week.

Quite evidently, arrangements based on monitoring traffic conditions over a wide range of possible combinations of the characteristics of the various antennas in the network are exposed to the risk that the optimal configuration for effectively covering e.g. a stadium during a match is reached only when the match is over and the stadium is finally empty.

More generally, arrangements based on monitoring traffic conditions are intrinsically not adapted for use in configuring communication networks at the stage of planning, i.e. when the network is still to be deployed.

The need therefore exists for arrangements wherein adaptive reconfigurable antennas can play an active role in ensuring user coverage by interacting with traffic data (whether planned, predicted, or monitored) notionally on a real time basis.

Such a need is particularly felt in the context of mobile telecommunication systems both of the second and of the third generation (3G) type.

In second generation systems such as GSM, the possibility of controlling and limiting the interference level is a key parameter in order to be able to cover as a high number of users as possible while ensuring a good quality of service without changing the number of channels available.

This is even more the case for third generation systems (such as UMTS) where the same frequency band is shared by various users.

In any case, the availability of dynamic systems adapted to be reconfigured rapidly and reliably in view of changing traffic requirements is particularly appreciated in configuring communication networks at the stage of planning, i.e. when the network is still to be deployed.

The object of the present invention is thus to meet these needs while overcoming the drawbacks of prior art arrangements as outlined in the foregoing.

According to the present invention, that object is achieved by means of a method having the features set forth in the claims that follow.

The present invention also relates to a corresponding network architecture and a computer program product loadable in the memory of at least one computer and including software code portions for performing the method of the invention. Reference to at least one computer is evidently intended to take into account that the method of the invention is adapted to be carried out in a decentralised manner, with different tasks allotted to different computers in a network.

In brief, the basic idea underlying the presently preferred embodiment of the invention is exploiting for the purpose of configuring a communication network the possibility of adjusting the radiation diagram of an antenna (i.e. a plurality of gain values for a set of directions over a plurality of directions from the antenna) as a function i.e. of the communication traffic offered at a given portion of the coverage area and of the attenuation experienced by the signal over the propagation path between the antenna and that portion of the coverage area.

Essentially, the invention overcomes all the limitations outlined in the foregoing in respect of known solutions that use reconfigurable antennas within the context of a communication network.

In the first place, adaptation criteria are provided that may be implemented both in actual operation of a mobile network and at the planning stage thereof, without requiring by way of necessity actual deployment of the network over the area intended to be covered by a network.

Additionally, the invention gives the possibility of reconfiguring antennas in the wider sense of the term, namely both as regards tilt and as regards the azimuth configuration of the radiation diagrams i.e. by selectively and independently allotting to each direction a respective gain value.

This is not the case for those prior art arrangements providing for (only) the tilt angle of the antenna being adjusted: in that case, the gain values for a number of directions are changed by inevitably retaining a fixed relationship determined by the "horizontal" shape of the diagram.

These intrinsic limitations of the prior art are dispensed with in the arrangement described herein, which effectively permits (re)configuration of a communication network to take place i) at the planning level—i.e. before the network is actually deployed, ii) by way of adjustment/optimisation of an already existing network, and iii) during current network operation, possibly in real-time conditions.

In a preferred embodiment of the invention, an objective configuration criterion is identified together with a corresponding operating process adapted for implementation in a dedicated software architecture. Such an architecture is capable of analysing the environment surrounding each antenna in terms of path loss (that is the attenuation to which the electromagnetic signal is subjected over the path between the antenna and each point in the area covered) and in terms of a traffic level forecast, estimated or actually measured for a given service or a complex set of services.

Knowledge of the path loss value is in fact representative of knowledge of the area of coverage of the respective cell. Such data, having a variable degree of reliability depending on the applications, are usually included in the facilities available with any planning instrument for mobile networks of the second and third generation.

Information concerning the traffic offered as a function of distribution over the area served, represents input data for planning networks of the third generation, which data are also useful in properly dimensioning second generation networks. Consequently, the arrangement disclosed herein does not require any appreciable information in addition to the information already currently available when planning a mobile telecommunication network.

A preferred embodiment of the invention analyses the traffic requirements of the whole area served and derives therefrom an optimum radiation diagram for configuring the respective antenna. Preferably, the results are optimised in terms of maximising the ratio of the traffic offered and collected in the coverage area to the attenuation experienced by the signal in the specific direction pointing to the "pixel" of the area covered being considered. Each single antenna can thus be configured for best serving those users that are "reachable" in terms of electromagnetic field with the minimum energy allocation in terms of signal irradiated, which in turn is a source of potentially interference with the other antennas included in the network. The search for the optimal configuration of the radiation diagram can be repeated for all the antennas in the network considered, by using as a final result an optimal integrated configuration related to all the radiating systems included in the network.

The arrangement described herein also lends itself to be possibly used in reconfiguring an existing network: specifically a number of areas operating under critical conditions may be identified and one or more reconfigurable antennas substituted for existing "fixed" antennas in order to solve the problems existing in the critical areas and possibly improve the performance of the whole network.

Irrespective of whether involving the whole set of antennas in a network or only a portion of them being analysed, the configuration process can be carried out at a control center (e.g. the base station controller) of the network and enforced through those control channels that already exist in the network for the purpose of monitoring operation.

The reconfiguration process is intrinsically a fast process, the only limitation being in fact provided by the availability of updated information on the environment. Reconfiguration may thus take place also repeatedly within a very short lapse of time. For instance, reconfiguration may be carried out with different frequencies during a day, in order to take into account the fact e.g. that traffic flows may not change appreciably during a good deal of the day, while being subjected to intensive modification as a result of events taking place during the weekend, during holiday periods or as a result of events such as sports and public events.

BRIEF DESCRIPTION OF THE DRAWINGS

The invention will now be described, by way of example only, by referring to the enclosed figures of drawing, wherein.

DETAILED DESCRIPTION OF THE PREFERRED EMBODIMENTS OF THE INVENTION

Figure 1:
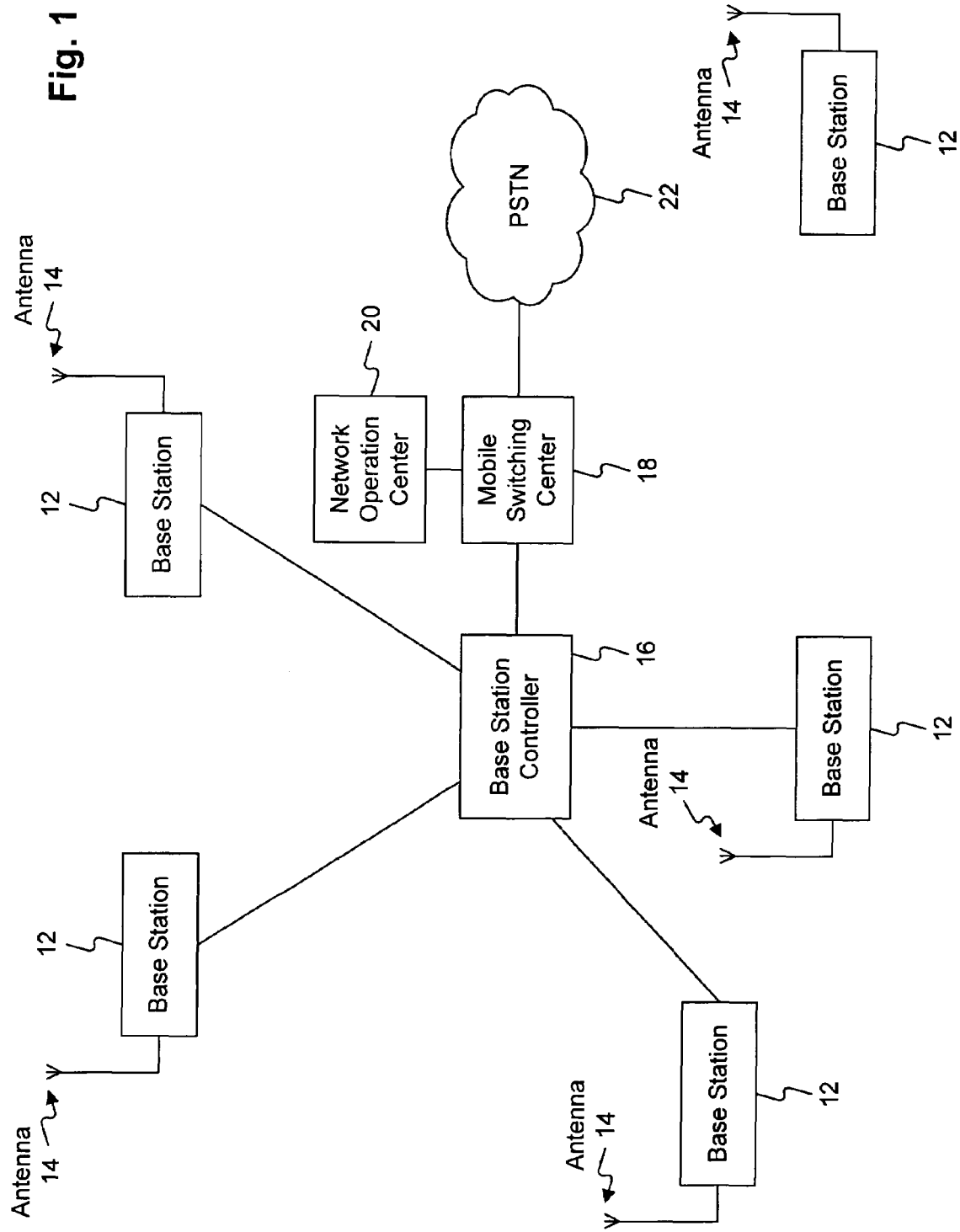
FIG. 1 is a diagram illustrating a telecommunication network adapted for use of the invention, FIG. 2 schematically represents the basic operating principle of a preferred embodiment of the arrangement described herein.

In FIG. 1, reference 10 indicates as a whole a telecommunication system such as a mobile communication network according to any known standard.

A GSM network or a UMTS network may be considered as examples of the so-called second and third generations (3G) of such systems. The invention is however applicable to any type of communication networks, even without limitation to a cellular communication network.

The schematic representation of FIG. 1 exclusively represents the "fixed" part of the network, excluding the mobile terminals. The fixed part of the network shown includes a plurality of base stations 12 each having associated therewith at least one respective radiation system such as an antenna 14.

Each or at least a part of the antennas 14 shown are of the kind whose radiation diagram may be selectively adjusted, thus making it possible to modify the radiation diagram of the antenna by means of electrical signals provided by the respective base station 12 depending e.g. on corresponding instructions received from base station controller 16.

The capability of adapting the propagation characteristics of the adjustable antennas 14 considered here is not limited to adjusting the tilt angle (downtilt).

In the preferred embodiment shown, adaptation of the antenna characteristics includes the possibility of selectively modifying the radiation diagram in the plane of the area served by the system, e.g. by possibly adding, removing lobes and/or selectively changing the mutual orientation and intensity of these lobes.

Antennas exhibiting such features (that is the ability of associating a selected gain value to practically each direction from the antenna over the area covered by their radiation diagram) are known in the art, e.g. in the form of so-called phased-array antennas.

General information concerning these antennas may be found e.g. in:

R. C. Hansen, "Microwave Scanning Antennas—vol. II Array Theory And Practice, and vol. III Array Systems", Academic Press, New York 1964, E. Brookner, Ed. "Practical phased-array antenna systems", Artech House, Boston 1991, or R. J. Mailloux "Phased array antenna handbook—Pattern synthesis for linear and planar arrays" Artech House, Boston 1994.

In the following it will be generally assumed that the base station controller 16 is connected to the mobile switching center (MSC) 18 of the network. The center 18 in turn operates under the control of a network operation center 20 in possible connection with one or more other networks such as a public switched telephone network (PSTN) 22.

It will be further appreciated that the architecture shown herein is a purely exemplary one. In fact, the arrangement disclosed herein may be easily operated also within the framework of different architectures such as decentralised networks providing for information and/or instructions for antenna reconfiguration being gathered and/or generated at any point in the network.

By way of general introduction to the underlying principles of the invention, it may be worth recalling that investigations (both of theoretical and experimental nature), concerning propagation of electromagnetic signals in telecommunication systems such as mobile systems show the amplitude of the electromagnetic signal to be actually subject to a degree of attenuation higher than the theoretical attenuation defined in the so-called free space.

In the case of propagation in the free space, attenuation is proportional to the square of the distance from the signal source and, therefore, proportional to the overall area adapted to be covered with a given useful value of signal intensity (so-called "coverage area").

The reasons leading to attenuation being in practice higher in comparison with the free-space model are related to the essential differences existing between the free space and a real environment. Even in the absence of obstacles to propagation, the real environment is characterised by the interaction of the electromagnetic signal with the earth surface. Additionally, obstacles are always present over the propagation path.

Similarly, in all radio links, including mobile links, attenuation associated with the propagation path/channel between the two communicating terminals is a basic parameter to ensure connection. Given a certain sensitivity of the receiver terminal (i.e. a minimum signal level required—but not sufficient in general—to ensure operation) the requirement for a minimum signal level in the presence of a given level of attenuation between the signal source and the receiver terminal can be guaranteed on the basis of basic considerations of energy balance over the communication path. This is in turn satisfied by adapting the power transmitted by the source and/or the efficiency or gain of the radiating system associated with.

As the value of attenuation over the path increases, ensuring a proper link becomes more and more expensive in terms of energy/power, which practically corresponds to a limitation of the coverage area.

The coverage area of a given electromagnetic source is intrinsically related to the amount of traffic for that area in connection with a given service or set of services that are to be provided by the telecommunication network. Even though remarkable fluctuations exist related to the non-uniform distribution of traffic over the territory, the total amount of traffic in a cell of a cellular communication system is in fact proportional to the extension of its coverage area and thus (at least approximately) to the square of the radius of the notional circular cell equivalent to the coverage area considered.

A preferred embodiment of the arrangement disclosed herein is thus based on the concept of regarding attenuation as a sort of "cost" factor while the traffic offered represents "benefit".

Figure 2:
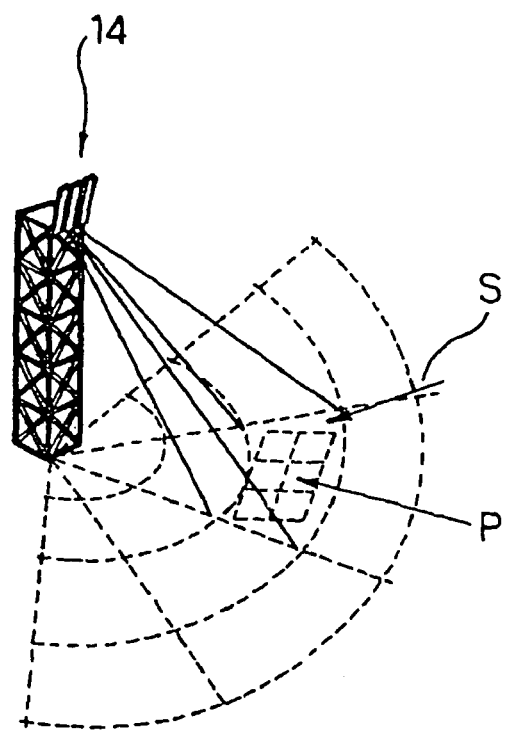

Therefore, once the position of a given antenna 14 is fixed, the territory surrounding the antenna in question (see FIG. 2) can be regarded as comprised of a plurality of portions or sectors S, each including a given set of pixels P, having dimensions of e.g. 50×50 meters.

Consequently, for each such pixel P a benefit/cost ratio can be defined as $$T_{pixel}/a_{pixel} = R_{bcpixel}$$

where:

$T_{pixel}$ (e.g. in Erlang) represents the traffic offered for the pixel, $a_{pixel}$ (e.g. in dB) represents the attenuation over the path between the antenna 14 and the pixel in question.

It will be appreciated that both the traffic and the attenuation parameters used for defining the ratio $R_{bcpixel}$ can either be predetermined (e.g. by way of forecast) during the planning phase of a network still to be deployed or measured, estimated or predicted during actual operation of a network already deployed once the expected levels of traffic in the coverage area and the levels of attenuation for the pixels comprised therein are known: this may result from calculations performed on the basis of propagation models.

Each of the pixels P in a given portion S of the covered area has an associated value of attenuation and the values of attenuation for all the pixels in the sector S investigated exhibit a minimum value $a_{min}$.

An optimisation function $f(a_0)$ may then be defined as follows:

$$f(a_0) = (1/a_0) \Sigma T_{pixel}/a_{pixel}$$

where the summation in the optimisation function extends for $a_{pixel}$ from $a_{min}$ to $a_0$ over all the pixels P in a given portion S of the covered area.

The summation indicated in the foregoing may be extended to any of the portions S, that are in turn determined on the basis of the solid angle resolution for which the radiation diagram of the antenna is to be optimised.

This is done by using a reference system whose origin is the antenna itself. For instance, FIG. 2 reports an example where the resolution has been chosen equal to 30° in azimuth ($\Delta\theta$) while the value in elevation ($\Delta\phi$) is selected in such a way as to define over the coverage area annular portions having identical radial widths.

Figure 3:
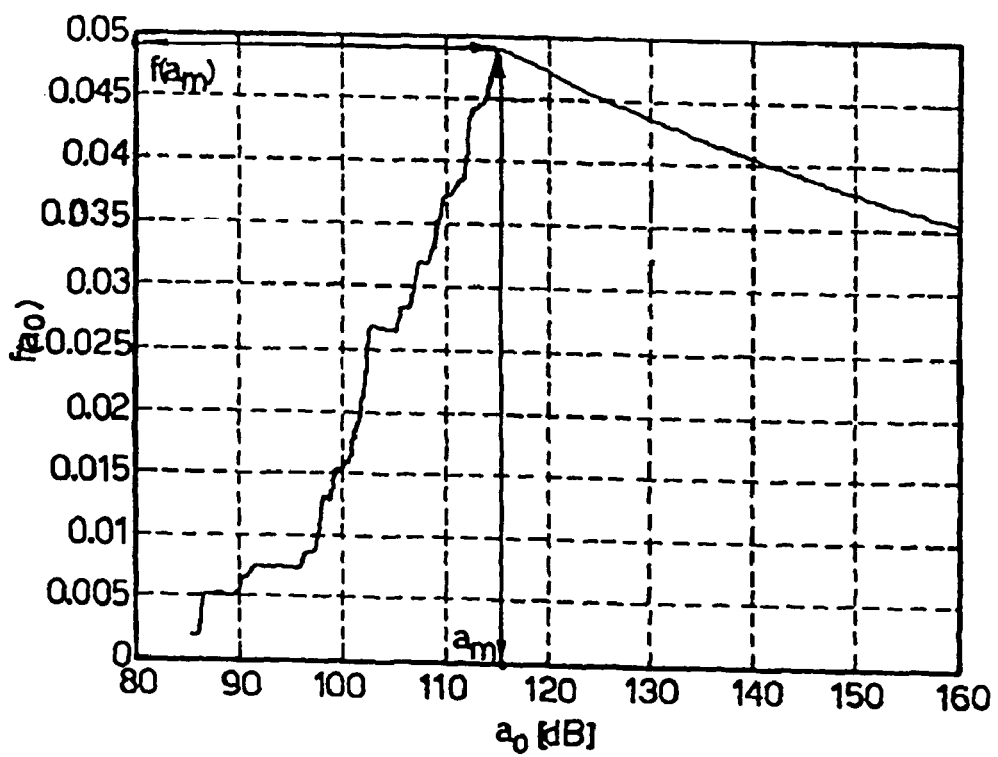
FIG. 3 is a diagram illustrative of the criterion schematically shown in FIG. 2, and FIGS. 4 and 5 are flow charts representing steps in a configuring process as disclosed herein.

In view of the typical behaviour of the entities $T_{pixel}$ and $a_{pixel}$, for each portion S of territory investigated, the function $f(a_0)$ exhibits a behaviour as shown by way of example in FIG. 3. Consequently, a value $a_m$ exists for the abscissa in FIG. 3 where the optimisation function has a maximum value $f(a_m)$.

Essentially, the optimisation function defined in the foregoing is a sort of cost function where the traffic values $T_{pixel}$ are weighed by means of the attenuation values.

A preferred embodiment of the arrangement shown herein aims at utilising, for each portion S of the area surrounding the antenna (defined by their coordinates $\Delta\theta_i, \Delta\phi_j$) the corresponding value $a_m$ as the optimal value of attenuation to be compensated with the antenna gain in that direction.

Consequently, the set of the values for $a_m$ obtained for all the portions S of territory considered identifies the shape of the radiation diagram to be used for the antenna in order to ensure that the optimising function is maximised in any direction.

The relationship of identity which relates the set of the attenuation values $a_m$ and the set of values that define the radiation diagram of the reconfigurable antenna must be understood in the relative sense with respect to a reference value.

Assuming that $G_{max}$ is the maximum gain obtainable with the reconfigurable antenna and $A_{max}$ the maximum value in the set of the attenuation values $a_m$ obtained for the various portions of the area investigated, the maximum gain $G_{max}$ is assigned to that portion of territory characterised by $A_{max}$, while to that portion of territory characterised by a generic attenuation value $a_{mi}$ a gain value $G_{mi}$ is assigned given by the following relationship:

$$G_{mi} = G_{max} - (A_{max} - a_{mi}).$$

Still by using the entities $A_{max}$ and $G_{max}$ it is possible to define the optimal power level $P_{feed}$ for the reconfigurable antenna as a function of the minimum amplitude of electro magnetic field $E_{min}$. Specifically, the power level in question is designated pilot power in UMTS networks and BCCH (Broadcast Control Channel) power in GSM networks. As already indicated, this is in turn related to the sensitivity of the mobile terminal.

In that respect, one needs simply refer to the well known relationship existing between the electromagnetic field level at a pixel, the transmitted power $P_T$ (in the meaning of Equivalent Isotropic Radiated Power—EIRP) from the antenna serving the cell, the path attenuation and the frequency f of the radio link.

This typically has the form indicated in the following wherein also the measurement units for the various entities are indicated.

$$E_{min}[dBuV/m] = P_T[dBm] + 20.\log f[MHz] + 77.27 - A_{max}[dB]$$

In the previous relationship, the transmitted power $P_T$ can be expressed as $$P_T[dBm] = (P_{feed}[dBm] - A_{cable}[dB] + G_{max}[dB])$$

where $A_{cable}$ is the attenuation introduced by the antenna feed cables (or waveguides) which is known.

In both relationships considered in the foregoing all the terms are generally known with the exception of the power $P_{feed}$. This may therefore be deduced from the formula. The value obtained for $P_{feed}$ must of course be compliant with the constraints set by the standards applicable for the network considered.

In any case the information obtained is useful in that e.g. if $P_{feed}$ is higher than the maximum value catered for by the standard, then a substantial likelihood exists that the orographic features and the traffic distribution in the area surrounding the antenna considered are such as to suggest the relocation of the antenna or the addition of new antenna sites in the network.

If no changes are made in the antenna location or if the number of the antennas in the network is not changed, the power $P_{feed}$ in the cell investigated will obviously be the maximum one provided for the standard even though it will not be possible to ensure the optimisation level defined in the foregoing.

Conversely, if $P_{feed}$ is lower than the maximum power value catered for by the standard, the value in question can be positively used for the base station considered. In that way the optimum level is ensured while achieving a tangible advantage in terms of reducing the interference generated in the surrounding portions of the network.

The arrangement disclosed in the foregoing can be obviously extended to any number of the antennas included in a network by applying the same criteria described in the foregoing.

Figure 4:
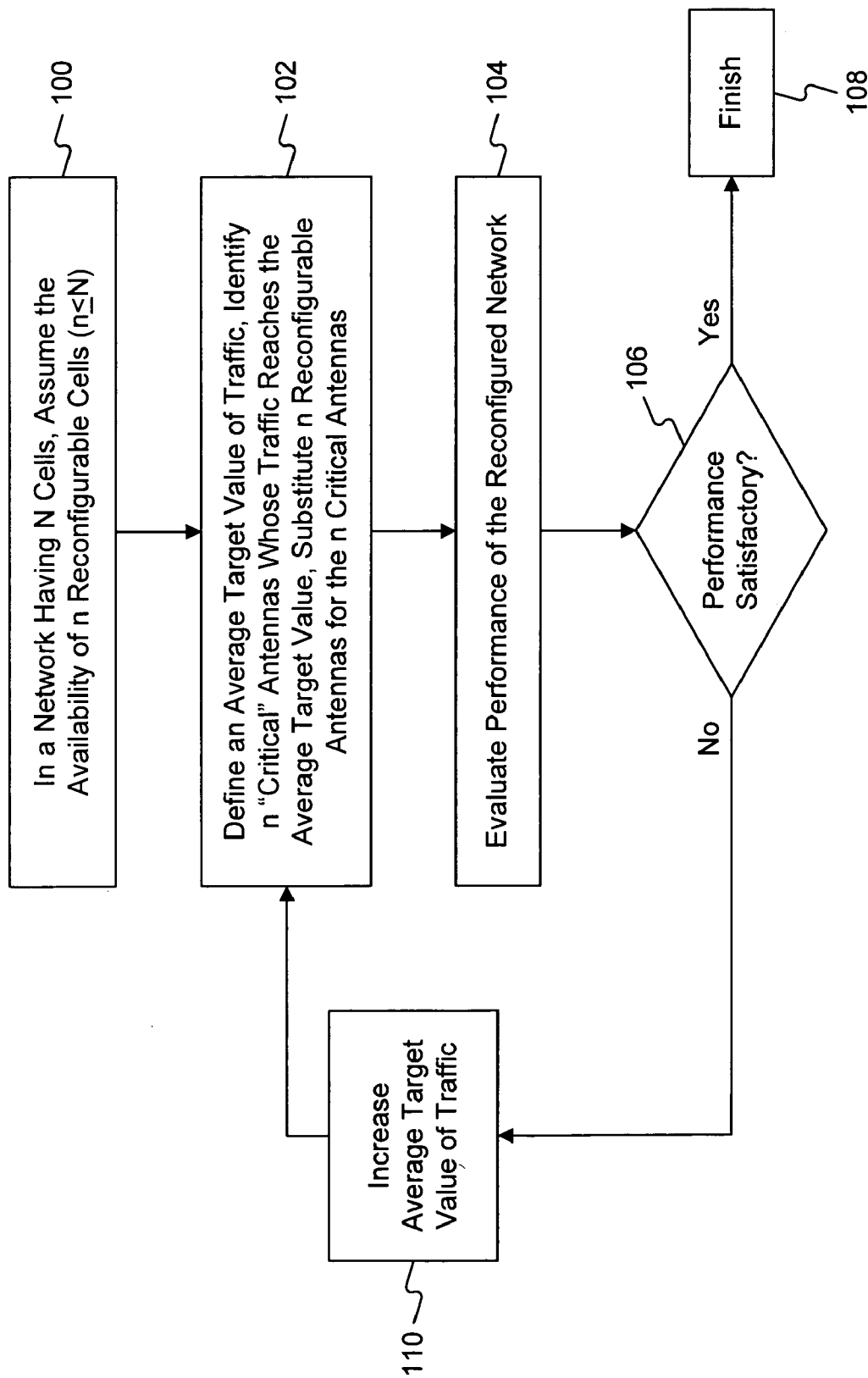

The flowchart of FIG. 4 refers to the possible application of the arrangement just described to planning a mobile network such as an UMTS network.

It will be generally assumed that an existing network design is already available based on N "conventional" cells/antennas, e.g. single-lobe antennas each pointing to a fixed direction (both in azimuth and elevation). It will also be assumed that the following information is available at the level of design forecast:

distribution of traffic offered,
service area covered by each cell
total amount of traffic carried,
average amount of traffic Tm carried by the cells, and
inter-cell interference levels.

The parameter $T_m$ can be regarded as a measure of the traffic captured by each of the cells analysed, and may be referred to as a target with the main object of distributing the traffic uniformly among the various cells and improving the configuration process of each antenna.

In a step 100, the availability of n reconfigurable cells will be assumed, with n≦N.

In a step 102 the configuration process described in the foregoing is applied to those n cells in the network that, when equipped with conventional, fixed antennas exhibit a level of traffic carried that more appreciably differs from the average level $T_m$ (e.g. 50% more or 50% less). These are of course just indicative values, and the absolute value of the positive threshold may differ from the absolute value of the negative threshold).

Stated otherwise, in the step 102 the average amount of traffic ($T_m$) served by the N cells/antennas is evaluated. At least one difference threshold (which may be either positive—e.g. X % more—or negative—e.g. Y % less) with respect to the average amount of traffic ($T_m$) is defined.

A subset of n "critical" antennas is then identified among the N antennas in the network for which the respective amounts of traffic reach the (positive or negative) difference threshold; n reconfigurable antennas are then substituted for these "critical" antennas.

In a step 104, performance of the network is evaluated by referring to a reconfigured network where n reconfigurable antennas have been substituted for conventional fixed antennas in the n "critical" cells identified in the foregoing. Specifically, performance of the network is evaluated in terms of distribution of the traffic carried.

In a step 106 a check is made as to whether the evaluated performance level is satisfactory.

In the case of a positive outcome of the step 106 (performance satisfactory), the system evolves to a final step 108.

In the case of a negative outcome of the step 106 (performance held not to be satisfactory), the system evolves to a step 110 where the average target value $T_m$ is increased (e.g. by 5%) and the process is repeated by evolving back to the step 102.

Figure 5:
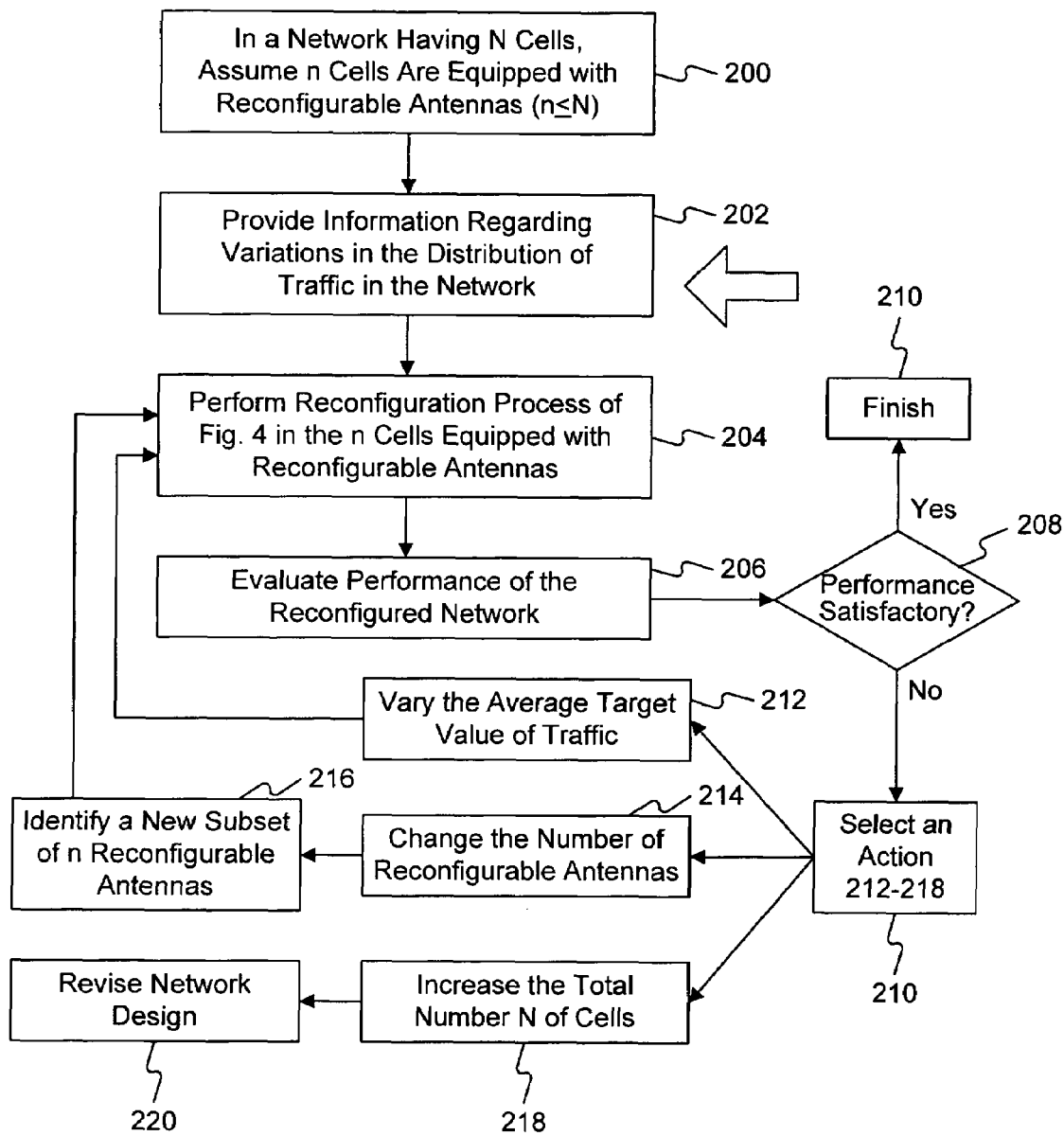

The flowchart of FIG. 5 refers to the possible application of the arrangement just described to optimising an already existing mobile network such as an UMTS network.

Again, in a step 200 it will be assumed that the network includes N cells/antennas out of which n cells are equipped with reconfigurable antennas. This may possibly result from the procedure shown in FIG. 4 having been previously applied. Again it will be assumed that n≦N.

A step 202 generally indicates the availability of information on variations in the distribution of the traffic offered, such cyclical variations occurring on a daily or weekly basis and/or as a result of public events, new dwellings or industrial/commercial activities in the area covered by the network.

In a step 204, the (re)configuration process described in the foregoing is applied to those n cells in the network equipped with reconfigurable antennas by taking into account the variation factors considered in the foregoing. It will be appreciated that such a reconfiguration need not necessarily lead to changing the radiation characteristics of all the reconfigurable antennas serving such cells.

In a step 206, performance of the network as reconfigured is evaluated in terms of overall traffic carried and distribution thereof.

In a step 208 a check is made as to whether the evaluated performance level is satisfactory.

In the case of a positive outcome of the step 208 (performance satisfactory), the system evolves to a final step 210.

In the case of a negative outcome of the step 208 (performance held not to be satisfactory) a number of options are open for action on the network as indicated by a step 210.

As a first option, in a step 212 the target in terms of average traffic $T_m$ may be varied e.g. as described in the foregoing with reference to the step 110 in FIG. 4.

Alternatively, in a step 214 the number of reconfigurable antennas may be changed e.g. by increasing the value of n of an increase factor Δn, thus leading to a new subset of reconfigurable antennas being defined in a step 216.

As a further alternative, in a step 218 the total number of cells can be increased thus leading in a step 220 to revising the network design.

After any of steps 212, 216 or 220 system evolves back to the step 204.

If the maximum level of traffic adapted to be carried by a cell is reached, the same criteria can be adopted as described with respect to the maximum power value considered in the foregoing.

It will be appreciated that the arrangement disclosed herein is in no way linked to a specific sequence in which the various cells equipped with a reconfigurable antennas are analysed. The arrangement disclosed herein provides a means for a guided planning of the network by following an optimisation criterion of the signal levels transmitted by each fixed source in the network. The arrangement disclosed herein also ensures in general terms an improvement of the traffic carried and/or a reduction of the amounts of power transmitted by the cells.

Of course, without prejudice to the underlying principle of the invention, the details and the embodiments may vary, also significantly, with respect to what has been described in the foregoing, just by way of example, without departing from the scope of protection of the invention as defined by the annexed claims. Specifically, those of skill in the art will appreciate that the invention is based on the general concept of determining, for each direction in the radiation diagram of an antenna a respective value of communication traffic, and selectively allotting to each direction a respective gain value as a function of e.g. the communication traffic determined for said direction and the attenuation value over the propagation path identified by that direction.

The nature of that function may thus be defined differently depending on the specific operating needs. Presently preferred choices are selecting the gain value for a given direction as the gain maximising a ratio ($R_{bcpixel}$) of the traffic value to the attenuation value and/or the gain optimising a cost function ($f(a_0)$) wherein the traffic value and the attenuation value represent benefit and cost factors, respectively.

This result may be—but does not necessarily need be—achieved on the basis of the specific relationship reported in the foregoing.

Also, those of skill in the art will appreciate that the possible field of application of the invention is in no way limited to wide area communication networks such as the UMTS networks referred to in the foregoing by way of example only. Alternative areas of application of the invention include e.g. local area networks such as WLANs in home and business contexts.

The invention claimed is:

1. A method for configuring a communication network having a plurality of antennas comprising the steps of:
   a) including in said plurality of antennas at least one reconfigurable antenna adapted to serve communication traffic in a respective coverage area, said reconfigurable antenna having a radiation diagram exhibiting a plurality of selectively adjustable gain values for a set of directions, each direction in said set defining a propagation path between the antenna and a portion of said coverage area;
   b) determining, for each direction in said set, at least one value of communication traffic and at least one attenuation value over said propagation path; and
   c) selectively and independently allotting to each direction in said set a respective gain value in the radiation diagram of said reconfigurable antenna as a function of said at least one of said traffic value ($T_{pixel}$) and of said attenuation value ($a_{pixel}$) determined for said direction.

2. The method of claim 1, wherein said gain value for each said direction is allotted as the gain maximising a ratio of said traffic value to said attenuation value.

3. The method of claim 1, wherein said gain value for each said direction is allotted as the gain optimising a cost function ($f(a_0)$) wherein said traffic value and said attenuation value represent benefit and cost factors, respectively.

4. The method of claim 1, comprising the steps of:
   subdividing said coverage area of said at least one reconfigurable antenna in a plurality of portions each including a plurality of pixels, wherein each said pixel has an associated value of communication traffic ($T_{pixel}$) and a propagation path from said antenna with an associated attenuation value, ($a_{pixel}$), whereby each said pixel has an associated benefit/cost ratio being the ratio of said associated communication traffic value ($T_{pixel}$) to said associated attenuation value ($a_{pixel}$);
   defining an optimisation function for all the pixels within a given portion depending on said benefit/cost ratio for the pixels in said portion; and
   allotting to the direction in said radiation diagram identifying each said portion a respective gain value optimising said optimisation function.

5. The method of claim 4, wherein each said pixel having associated a given value of attenuation, and $a_{min}$ being the minimum value of the values of attenuation for all the pixels in said given portion, said optimisation function is defined as $$f(a_0) = (1/a_0)\Sigma T_{pixel}/a_{pixel}$$

where the summation extends for $a_{pixel}$ from $a_{min}$ to $a_0$ over all the pixels in a given portion of said coverage area, and $T_{pixel}/a_{pixel}$ is said benefit/cost ratio.

6. The method of claim 1, comprising the steps of:
   selecting said at least one reconfigurable antenna as an antenna having a maximum gain value ($G_{max}$);
   determining for each direction in said set a respective attenuation value ($a_{mi}$) to be compensated by a respective gain value in said radiation diagram, said attenuation values having a maximum ($A_{max}$); and
   associating with said direction in said radiation diagram gain values based on the relationship:

$$G_{mi} = G_{max} - (A_{max} - a_{mi}),$$

wherein $G_{max}$ is said maximum gain, $A_{max}$ is said maximum of attenuation and $a_{mi}$ is the attenuation value determined for the direction to which the gain $G_{mi}$ is assigned.

7. The method of claim 1, comprising the steps of:
   determining a field intensity value ($E_{min}$) required to provide said communication traffic over the area covered by the radiation diagram of said at least one reconfigurable antenna;
   determining a power value ($P_{feed}$) for said antenna to provide said field value ($E_{min}$);
   comparing said power value determined ($P_{feed}$) with a maximum threshold value; and
   if said power value as determined ($P_{feed}$) exceeds said maximum threshold value, issuing a signal indicating that the antenna is to be relocated.

8. The method of claim 1, comprising the steps of:
   configuring said network as a step of planning a still undeployed network; and
   determining said respective value of communication traffic ($T_{pixel}$) as a planned parameter of said still undeployed network.

9. The method of claim 1, comprising the steps of:
   configuring said network as a step of managing an already existing network; and
   determining said respective value of communication traffic ($T_{pixel}$) as at least one of a forecast parameter and a measured parameter of said already existing network.

10. A method for configuring a communication network including a plurality of antennas each serving a respective amount of traffic within a respective coverage area, comprising the steps of:
    determining a reference amount of traffic ($T_m$) served by said plurality of antennas in the network;
    setting at least one difference threshold with respect to said reference amount of traffic ($T_m$);
    identifying among said plurality of antennas a subset of antennas, wherein the respective amounts of traffic served by the antennas in said subset reach said difference threshold; and
    configuring the antennas in said subset as reconfigurable antennas, each having a radiation diagram exhibiting a plurality of selectively adjustable gain values for a set of directions, each direction in said set defining a propagation path between the antenna and a portion of said coverage area; and
    applying to the reconfigurable antennas in said subset the steps b) and c) of claim 1 to reconfigure said network.

11. The method of claim 10, comprising the step of defining said reference amount of traffic as the average amount of traffic ($T_m$) served by said plurality of antennas.

12. The method of claim 10, comprising the step of checking the performance level of said reconfigured network.

13. The method of claim 12, comprising the steps of:
    defining at least one criterion for satisfactory performance level of said network;

checking the performance level of said reconfigured network against said criterion; and if said checking reveals that said performance level fails to meet said criterion, taking at least one of the steps of:
varying said reference amount of traffic ($T_m$),
increasing the number of said reconfigurable antennas in said subset, and
increasing the total number of antennas in the network.

14. A network architecture for a communication network including a plurality of antennas comprising:
at least one reconfigurable antenna adapted to serve communication traffic in a respective coverage area, wherein
said at least one reconfigurable antenna has a radiation diagram exhibiting a plurality of selectively adjustable gain values for a set of directions, and wherein
each direction in said set defines a propagation path between the antenna and a portion of said coverage area, and
has associated
at least one value of communication traffic ($T_{pixel}$) and at least one attenuation value ($a_{pixel}$) over said propagation path, and
a respective gain value for said radiation diagram which is a function of at least one of said traffic value ($T_{pixel}$) and of said attenuation value ($a_{pixel}$).

15. The network architecture of claim 14, wherein said gain value for each said direction is the gain maximising a ratio of said traffic value to said attenuation value.

16. The network architecture of claim 14, wherein said gain value for each said direction is the gain optimising a cost function ($f(a_0)$) wherein said traffic value and said attenuation value represent benefit and cost factors, respectively.

17. The network architecture of claim 14, wherein
said coverage area of said at least one reconfigurable antenna is subdivided in a plurality of portions each including a plurality of pixels, wherein each said pixel has an associated value of communication traffic ($T_{pixel}$) and a propagation path from said antenna with an associated attenuation value ($a_{pixel}$), whereby each said pixel has an associated benefit/cost ratio being the ratio of said associated communication traffic value ($T_{pixel}$) to said associated attenuation value ($a_{pixel}$),
for all the pixels within a given portion an optimisation function exists depending on said benefit/cost ratio for the pixels in said portion, and
said gain value for each said direction is the gain optimising said function.

18. The network architecture of claim 17, wherein each said pixel having associated a given value of attenuation and $a_{min}$ is the minimum value of the values of attenuation for all the pixels in said given portion, said optimisation function being defined as $$f(a_0) = (1/a_0)\Sigma T_{pixel}/a_{pixel}$$

where the summation extends for $a_{pixel}$, from $a_{min}$ to $a_0$ over all the pixels in a given portion of said coverage area, wherein $T_{pixel}/a_{pixel}$ is said benefit/cost ratio.

19. The network architecture of claim 14, wherein
said at least one reconfigurable antenna is an antenna having a maximum gain value ($G_{max}$), and wherein for each direction in said set a respective attenuation value ($a_{mi}$) exists to be compensated by a respective gain value in said radiation diagram, said attenuation values having a maximum ($A_{max}$), and each said direction in said radiation diagram has an associated gain value $G_{mi}$ based on the relationship:

$$G_{mi} = G_{max} - (A_{max} - a_{mi}),$$

wherein $G_{max}$ is said maximum gain value, $A_{max}$ is said maximum attenuation and $a_{mi}$ is an attenuation value determined for the direction to which the gain value $G_{mi}$ is assigned.

20. A computer program product capable of being loadable in the memory of at least one computer and including software code portions for performing a method of configuring a communication network having a plurality of antennas, the method comprising the steps of:
a) including in said plurality of antennas at least one reconfigurable antenna adapted to serve communication traffic in a respective coverage area, said reconfigurable antenna having a radiation diagram exhibiting a plurality of selectively adjustable gain values for a set of directions, each direction in said set defining a propagation path between the antenna and a portion of said coverage area;
b) determining, for each direction in said set, at least one value of communication traffic and at least one attenuation value over said propagation path; and
c) selectively and independently allotting to each direction in said set a respective gain value in the radiation diagram of said reconfigurable antenna as a function of said at least one of said traffic value ($T_{pixel}$) and of said attenuation value ($a_{pixel}$) determined for said direction.

21. A method for configuring a communication network including a plurality of antennas, the method comprising:
including in said plurality of antennas at least one reconfigurable antenna adapted to serve communication traffic in a respective coverage area, said reconfigurable antenna having a radiation diagram exhibiting a plurality of selectively adjustable gain values for a set of directions, each direction in said set defining a propagation path between the antenna and a portion of said coverage area, each portion including a plurality of pixels, wherein each pixel has an associated value of communication traffic and a propagation path from said antenna with an associated attenuation value;
determining, for each direction in said set, a reference attenuation value over the propagation path defined by the direction, said reference attenuation value depending on a benefit/cost ratio for the pixels included in said portion, said benefit/cost ratio being a ratio between said communication traffic value and said attenuation value in each said pixel;
determining a maximum attenuation value ($A_{max}$) of said reference attenuation values ($a_{mi}$) associated with each direction;
determining a maximum gain value ($G_{max}$) of said radiation diagram of said at least one reconfigurable antenna in said coverage area;
associating said maximum gain value with the direction having said maximum attenuation value; and
determining for the other directions a respective gain value ($G_{mi}$) in the radiation diagram of said reconfigurable antenna based on the relationship $$G_{mi} = G_{max} - (A_{max} - a_{mi}).$$

22. The method of claim 21, wherein said reference attenuation value corresponds to the attenuation value that maximizes an optimization function ($f(a_0)$) defined as:

$$f(a_0) = (1/a_0)\Sigma T_{pixel}/a_{pixel}$$

where $T_{pixel}/a_{pixel}$ is said benefit/cost ratio and the summation extends from an attenuation value $a_{min}$ to an attenuation value $a_0$ over all the pixels included in said portion of said coverage area, said attenuation value $a_{min}$ being the minimum value of the values of attenuation for all the pixels included in said portion.

23. The method of claim 21, further comprising:
determining a field intensity value required to provide said communication traffic over the area covered by the radiation diagram of said at least one reconfigurable antenna;
determining a power value for said antenna to provide said field value;
comparing said power value determined with a maximum threshold value; and
if said power value as determined exceeds said maximum threshold value, issuing a signal indicating that the antenna is to be relocated.

24. The method of claim 21, further comprising:
configuring said network as a step of planning a still undeployed network; and
determining said value of communication traffic as a planned parameter of said still undeployed network.

25. The method of claim 21, further comprising:
configuring said network as a step of managing an already existing network; and
determining said value of communication traffic as at least one of a forecast parameter and a measured parameter of said already existing network.

26. A method for configuring a communication network including a plurality of antennas each serving a respective amount of traffic within a respective coverage area, the method comprising:
determining a reference amount of traffic served by said plurality of antennas in the network;
setting at least one difference threshold with respect to said reference amount of traffic;
identifying among said plurality of antennas a subset of antennas, wherein the respective amounts of traffic served by the antennas in said subset reach said difference threshold;
configuring the antennas in said subset as reconfigurable antennas, each having a radiation diagram exhibiting a plurality of selectively adjustable gain values for a set of directions, each direction in said set defining a propagation path between the antenna and a portion of said coverage area; and
applying to the reconfigurable antennas in said subset the following steps to reconfigure said network:
determining, for each direction in said set, a reference attenuation value over the propagation path defined by the direction, said reference attenuation value depending on a benefit/cost ratio for the pixels included in said portion, said benefit/cost ratio being a ratio between a communication traffic value and an attenuation value in each said pixel; and
determining a maximum attenuation value of said reference attenuation values associated with each direction.

27. The method of claim 26, further comprising:
defining said reference amount of traffic as the average amount of traffic served by said plurality of antennas.

28. The method of claim 26, further comprising:
checking the performance level of said reconfigured network.

29. The method of claim 28, further comprising:
defining at least one criterion for satisfactory performance level of said network;
checking the performance level of said reconfigured network against said criterion; and
if said checking reveals that said performance level fails to meet said criterion, taking at least one of the steps of:
varying said reference amount of traffic,
increasing the number of said reconfigurable antennas in said subset, and
increasing the total number of antennas in the network.

30. A network architecture for a communication network including a plurality of antennas, the network architecture comprising:
at least one reconfigurable antenna adapted to serve communication traffic in a respective coverage area,
wherein said at least one reconfigurable antenna has a radiation diagram exhibiting a plurality of selectively adjustable gain values for a set of directions, and wherein each direction in said set:
defines a propagation path between the antenna and a portion of said coverage area, said portion including a plurality of pixels, wherein each pixel has an associated value of communication traffic and a propagation path from said antenna with an associated attenuation value, and
has associated:
a reference attenuation value over the propagation path defined by the direction, said reference attenuation value depending on a benefit/cost ratio for the pixels included in said portion, said benefit/cost ratio being a ratio between said communication traffic value and said attenuation value in each said pixel, and
a respective gain value ($G_{mi}$), said respective gain value being determined by means of the relationship $$G_{mi} = G_{max} - (A_{max} - a_{mi})$$

where $A_{max}$ is a maximum attenuation value of said reference attenuation values ($a_{mi}$) associated with each direction in said coverage area and $G_{max}$ is the maximum gain value of said radiation diagram of said at least one reconfigurable antenna associated with the direction having said maximum attenuation value.

31. The network architecture of claim 30, wherein said reference attenuation value corresponds to the attenuation value that maximises an optimization function ($f(a_0)$) defined as:

$$f(a_0) = (1/a_0) \Sigma T_{pixel}/a_{pixel}$$

where $T_{pixel}/a_{pixel}$ is said benefit/cost ratio and the summation extends from an attenuation value $a_{min}$ to an attenuation value $a_0$ over all the pixels included in a given portion of said coverage area, said attenuation value $a_{min}$ being the minimum value of the values of attenuation for all the pixels included in said given portion.

32. A computer program product loadable in the memory of at least one computer and including software code portions for performing a method of configuring a communication network including a plurality of antennas, the method comprising:
including in said plurality of antennas at least one reconfigurable antenna adapted to serve communication traffic in a respective coverage area, said reconfigurable antenna having a radiation diagram exhibiting a plurality of selectively adjustable gain values for a set of directions, each direction in said set defining a propagation path between the antenna and a portion of said coverage area, each portion including a plurality of pixels, wherein each pixel has an associated value of communication traffic and a propagation path from said antenna with an associated attenuation value;

determining, for each direction in said set, a reference attenuation value over the propagation path defined by the direction, said reference attenuation value depending on a benefit/cost ratio for the pixels included in said portion, said benefit/cost ratio being a ratio between said communication traffic value and said attenuation value in each said pixel;

determining a maximum attenuation value ($A_{max}$) of said reference attenuation values ($a_{mi}$) associated with each direction;

determining a maximum gain value ($G_{max}$) of said radiation diagram of said at least one reconfigurable antenna in said coverage area;

associating said maximum gain value with the direction having said maximum attenuation value; and determining for the other directions a respective gain value ($G_{mi}$) in the radiation diagram of said reconfigurable antenna based on the relationship $$G_{mi} = G_{max} - (A_{max} - a_{mi}).$$

* * * * *

UNITED STATES PATENT AND TRADEMARK OFFICE
CERTIFICATE OF CORRECTION

PATENT NO. : 7,286,854 B2 Page 1 of 1
APPLICATION NO. : 10/562425
DATED : October 23, 2007
INVENTOR(S) : Ferrato et al.

It is certified that error appears in the above-identified patent and that said Letters Patent is hereby corrected as shown below:

Claim 30, column 16, line 30, "benefitlcost" should read --benefit/cost--.

Claim 30, column 16, line 32, "benefitlcost" should read --benefit/cost--.

Signed and Sealed this

Seventeenth Day of June, 2008

JON W. DUDAS
*Director of the United States Patent and Trademark Office*